INVENTOR.
ARNOLD A. WINSLOW.
BY
HIS ATTORNEY.

INVENTOR.
ARNOLD A. WINSLOW.
BY
HIS ATTORNEY.

March 11, 1958　　　A. A. WINSLOW　　　2,826,368
COMBINATION BROILER AND OVEN CONTROL
Filed Oct. 17, 1955　　　　　　　　　3 Sheets-Sheet 3

INVENTOR.
ARNOLD A. WINSLOW.
BY
HIS ATTORNEY.

United States Patent Office 2,826,368
Patented Mar. 11, 1958

2,826,368

COMBINATION BROILER AND OVEN CONTROL

Arnold A. Winslow, Greensburg, Pa., assignor to Robertshaw-Fulton Controls Company, Greensburg, Pa., a corporation of Delaware Application October 17, 1955, Serial No. 540,779

10 Claims. (Cl. 236—99)

This invention relates to oven and broiler controls and more particularly to a combination control for fluid fuel burning ranges.

It is an object of this invention to control separate oven and broiler burners by means of a single manually operable control.

Another object of this invention is to control a shut-off valve and a thermostatic valve by a single manually operable member whereby one of the valves may be operated independently of the other.

Another object of this invention is to incorporate in a multiple valve structure, a means whereby the shut-off valve is fully open at all temperature settings.

In one preferred embodiment of the invention, a casing is provided with an inlet passage and a pair of outlet passages for fluid. A manually operable shut-off valve is positioned within said casing and has one position wherein said inlet communicates with one of said outlet passages and another position wherein said inlet passage communicates with the other said outlet passage. Thermostatic valve means are positioned in one of said outlet passages for controlling the flow of fluid therethrough in response to variations in a temperature condition. Manually operable means are provided for adjusting the temperature responsive means and also the shut-off valve, and means are provided whereby the thermostatic valve means may be adjusted independently of the shut-off valve.

Other objects and advantages will become apparent from the following description taken in connection with the accompanying drawings wherein.

Figure 1:
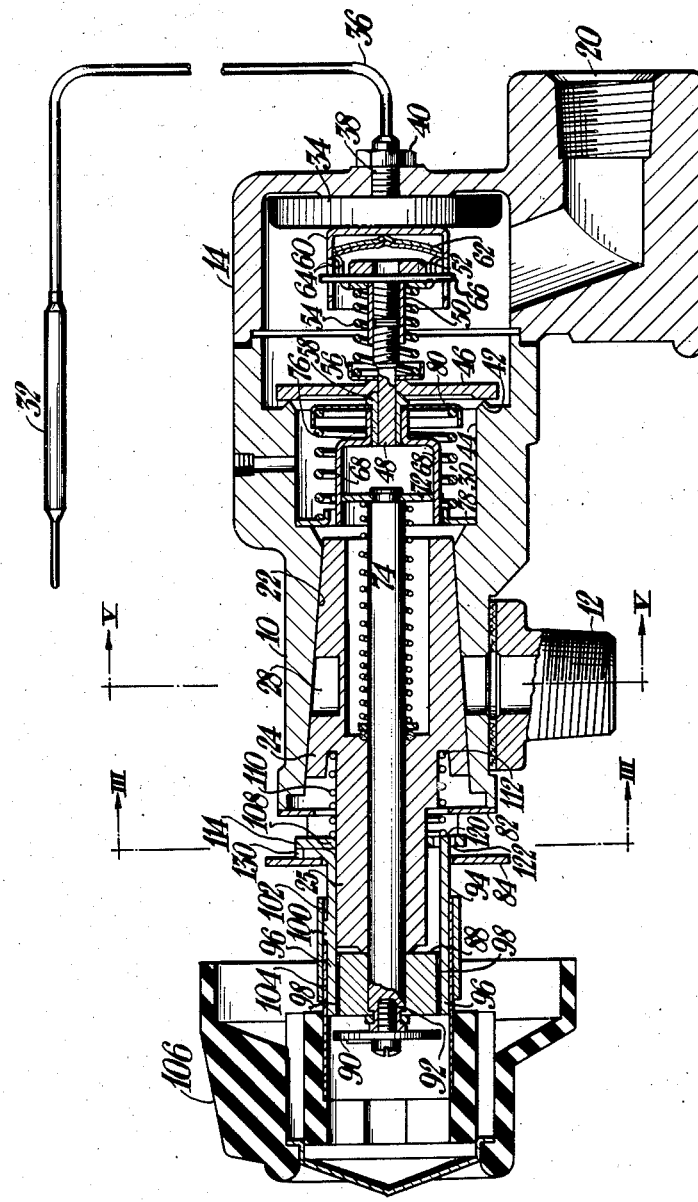
Fig. 1 is a longitudinal section of a combination control valve embodying this invention.
Figure 5:
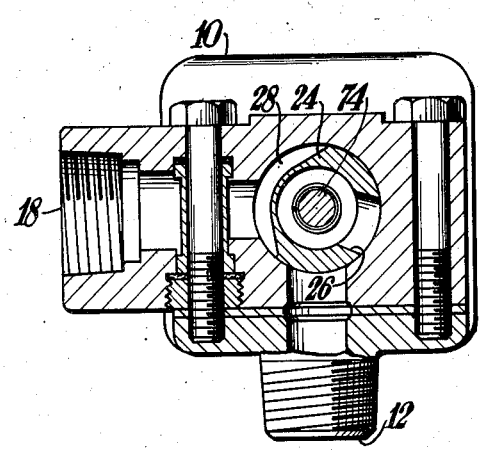
Figure 6:
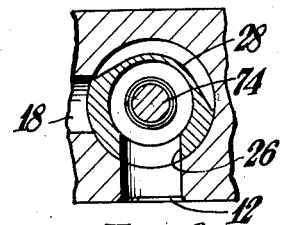
Figure 8:
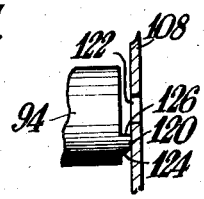
Figure 7:
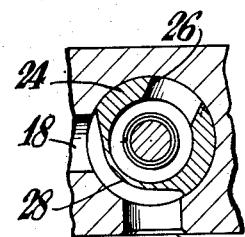

Figs. 5, 6, and 7 are sections taken along the line V—V of Fig. 1 showing different operating positions of the parts;

Fig. 8 is an elevation of a detail.

Figure 3:
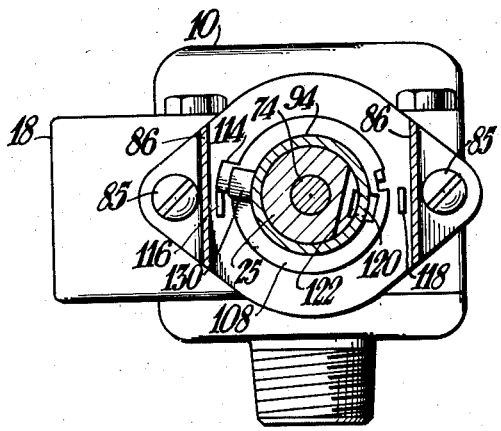

Referring more particularly to Figs. 1 and 3 the control device includes a main casing 10 provided with an inlet 12 for gas or other fluid, and having an end casing 14 detachably secured thereto. The casings 10 and 14 are provided with outlets 18 and 20 respectively for supplying fuel to fluid fuel burners (not shown).

The casing 10 is provided with a tapered valve seat 22 within which a hollow plug valve member 24 having an axial extending D-shaped cross-section stem 25 is seated and adapted to rotate. As shown in Fig. 6, communication between the inlet 12 and hollow interior of the plug valve member 24 is afforded by a port 26 formed in the valve member 24 and positioned whereby the same will be in alignment with the inlet 12 in one position of the plug valve member 24. Communication between the inlet 12 and outlet 18 is afforded by an arcuate recess 28 formed in the tapered surface of the valve member 24 whereby the same will connect the inlet 12 and outlet 18 in another position of the valve member 24 shown in Fig. 7. When the plug valve member 24 is positioned intermediate the aforesaid positions as shown in Fig. 5, a portion of the tapered surface thereof faces the inlet 12 and prevents flow of fuel to either the outlet 20 or the hollow interior of the plug valve member 24. Thus, in the position shown in Fig. 5, the plug valve member is in "off" position, and clockwise and counterclockwise rotation thereof from said "off" position establishes communication between the inlet 12 and interior thereof and inlet 12 and outlet 18 respectively.

Referring now to Fig. 1, the hollow interior of the plug valve member 24 communicates with a chamber 30 defined by casings 10 and 14 and communicating with the other outlet 20. The end casing 14 carries a thermostatic mechanism comprising a bulb 32, which may be located in the oven of a range and is connected to an expansible and contractible power element 34 by means of a capillary tube 36. As is customary in devices of this type, the power element 34 carries a hollow stud 38 which extends through a suitable aperture in the bottom wall of the end casing 14. A nut 40 threaded on the stud 38 serves to secure the power element 34 to the casing 14. The bulb 32, tube 36, and element 34 comprise a closed system filled with a fluid which upon changes in temperature sensed by the bulb 32 will serve to expand and contract the power element 34 in a manner well known to those skilled in the art.

An annular valve seat 42 is formed on the casing 10 within the chamber 30 and defines a valve port 44 through which fluid may flow from the interior of the plug valve member 24 to the outlet 20. A disc-shaped valve member 46 is located in the chamber 30 to be reciprocable into and out of engagement with the valve seat 42 and is loosely mounted on a reciprocable and rotatable valve stem 48 which has one end thereof extending through the valve member 46 toward the plug valve member 24 in axial alignment therewith for cooperation with an operating means later to be described. The other end of the valve stem 48 extends toward the power element 34 for reception in an internally threaded tubular adjusting element 50 having an integrally formed flange 52.

A spring 54 encircles the stem 48 and is mounted in compression between the flange 52 and a disc 56 slidably positioned on the stem 48. The spring 54 is operative to bias the valve member 46 toward engagement with a tubular abutment member 58 carried by the upstream end of the stem 48 and is operative during excessive temperature conditions to permit override of the power element 34 in a manner well known in the art.

For transmitting movement from the power element 34 to the valve stem 48, a cup-shaped member 60 is fixed to the power element 34 in axial alignment therewith. A curved bimetal compensating element 62 of a well known type engages the bottom wall of the member 60 and has the periphery thereof engaging the end of another cup-shaped member 64 which is slidably positioned in the member 60 and has the bottom wall thereof slidably mounted on the adjusting element 50 between the spring 54 and flange 52. Diametrically opposed slots are provided in the cup-shaped members 60 and 64 and adapted to receive a pin 66 projecting from the tubular adjusting element 50. The pin 66 prevents rotation of the cup-shaped member 60 and adjusting element 50.

Rotation of the adjusting element 50 is thus prevented by the pin 66, and rotation of the stem 48 causes axial movement thereof and positioning of the valve member 46 relative to the seat 42 in a manner well known in the art.

To effect adjustment of the stem 48, the abutment member 58 is provided with a pair of integral extending tangs 68 which are slidably positioned in a pair of slots formed in a flange 72. The flange 72 is carried by one end of an operating shaft 74, the other end of which extends through the plug valve 24 and stem 25 in axial alignment therewith and exteriorly of the casing 10 for cooperation with manually operable means later to be described. Upon rotation of the operating shaft 74, the assembly comprising abutment 58, valve stem 48, and valve member 46 will be moved axially thereby positioning the valve member 46 relative to the seat 42 to vary the temperature at which the valve member 46 will engage the seat 42.

The valve member 46 is biased toward open position thereof by means of a spring 76 mounted in compression between a retaining washer 78 fixed to the wall of a casing 10 and the washer 80 fixed to an annular recess of the abutment member 58. The spring 54 is preferably stronger than the spring 76 whereby expansion of the power element 34 will cause yielding of the spring 76 until the valve member 46 engages the seat 42 whereupon further expansion of the power element 34 will cause yielding of the spring 54. The thermostatic valve means thus operates in a manner well known in the art and further description is deemed unnecessary.

Figure 2:
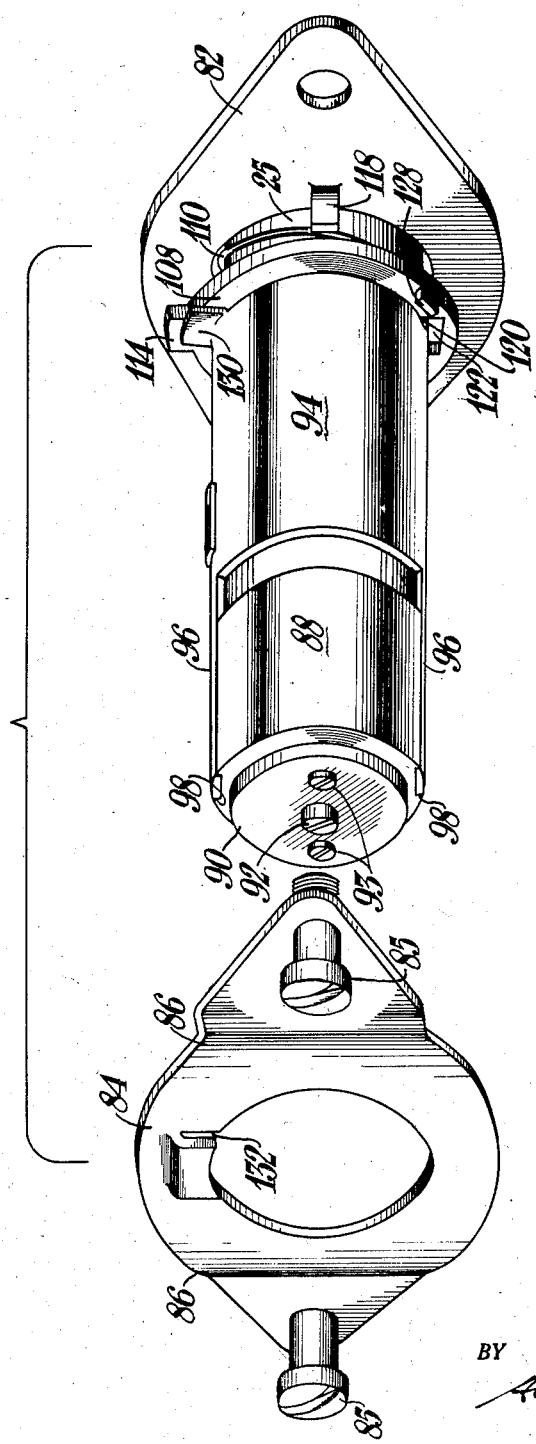
Fig. 2 is a perspective view of a portion of the control valve showing the cover plate removed.

Referring now to Figs. 1 and 2 and more particularly to the rotating means for the plug valve member 24 and shaft 74, the shaft 74 extends through circular openings in two concentric cover plates 82 and 84 attached to the end of the casing 10 by screws 85 inserted through oppositely disposed lugs of said plates and threaded within the casing 10. As shown more clearly in Fig. 2, the upper plate 84 is provided with bent portions 86 to provide a spacing between said plates for a purpose which will later become apparent.

A collar 88 is slidably positioned on the exterior end of the shaft 74 and engages the end of the valve stem 25. Calibrating means for the thermostat are provided by a plate 90 carrying suitable indicia and engaging a shoulder of the shaft 74 and carrying an adjusting screw 92 which is threaded in the end of the operating shaft 74. A pair of screws 93 extend through the plate 90 in threaded engagement with the collar 88 and when tightened affect rigid engagement of a shoulder of the shaft 74 with the collar 88 thereby causing rotation of the collar 88, plate 90, screws 92, 93 as a unit, but when loosened permit rotation of the screw 92 and shaft 74 relative to the collar 88 for calibrating the thermostat. Calibrating devices of this type are well known in the art and further description is deemed unnecessary.

A tubular sleeve 94 is slidably mounted on the valve stem 25 between the collar 88 and the upper cover plate 84 and provided with a pair of integral oppositely disposed tongues 96 projecting from the upper end thereof and into complemental extending slots 98 formed in the outer surface of the collar 88. One tongue 96 is provided with an abutment 100 which is adapted to be received by a slot 102 in the interior wall of a projecting sleeve 104 carried by a manually operable dial 106. The dial 106 is thus keyed to the sleeve 94 which in turn is keyed to the collar 88 and operating shaft 74. Rotation of the dial 106 thus causes rotation of the assembly including the collar 88, sleeve 94, and operating shaft 74.

Figure 4:
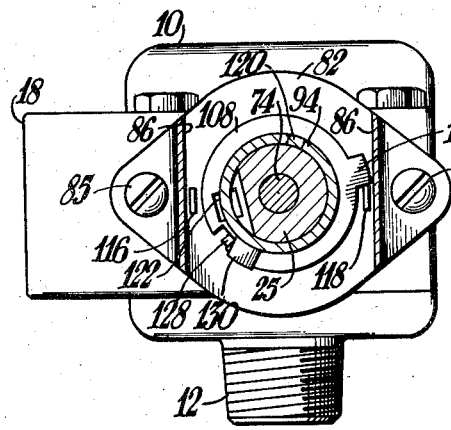
Figs. 3 and 4 are sections taken along the line III—III of Fig. 1 showing different operating positions of the parts.

Driving means are provided for operating the plug valve member 24 between its aforesaid positions by rotational movement of the dial 106 and to this end, a driving disc 108 of larger diameter than the openings defined by the plates 82 and 84 and having a complemental D-shaped opening therein as shown in Figs. 3 and 4 is loosely mounted on the valve stem 25 between the said plates. The disc 108 is keyed to the stem 25 by means of the D-shaped opening therein and is biased toward engagement with the upper plate 84 by means of a spring 110 which is mounted in compression between the disc 108 and the bottom of an annular recess 112 formed in the upper end of the plug valve member 24. It will also be apparent that the spring 110 biases the plug valve member 24 into engagement with the valve seat 22.

Referring now to Figs. 2, 3, and 4, the drive disc 108 is provided with an integral extending arm 114 which is cooperable with a pair of oppositely disposed stop members 116, 118 projecting from the lower cover plate 82. The disc 108 is preferably positioned whereby the arm 114 is positioned intermediate the stop members 116 and 118 when said plug valve is in the "off" position as shown in Fig. 2, but as shown in Figs. 3 and 4 engages the stop member 118 when the port 26 is aligned with the inlet 12 and the stop member 116 when the recess 28 connects inlet 12 and outlet 18. Thus, the stop members 116, 118 define a range of movement for the plug valve member 24.

Referring now to Figs. 1, 2 and 8, the end of the sleeve 94 is provided with an integral extending tang 120 which is cooperable with a slot 122 in the disc 108. The tang 120 is provided with a generally inclined edge 124 which is adapted to engage one edge of a slot 122 during clockwise rotation of the sleeve 94 and is provided with an edge 126 substantially normal to the disc 108 which engages another edge of the slot 122 during counterclockwise rotation of the sleeve 94. As shown more clearly in Fig. 2, the disc 108 is provided with an integral extending abutment 128 adjacent the slot 122 which engages the upper plate 82 under the bias of spring 110. The abutment 128 is operative as a stop for limiting rotation of the sleeve 94 as will later become apparent.

The disc 108 and plug valve member 24 are rotatable with the sleeve 94 between the aforesaid limits defined by the stop members 116 and 118 by means of the tang 120. Also, by means of the tang 120, the sleeve 94 is adapted to be disengaged from the disc 108 to permit independent adjustment of the thermostatic valve means by means of the shaft 74. Referring now to Fig. 8, the surface 124 of the tang 120 is shaped whereby upon additional clockwise rotation of the sleeve 94 when the arm 114 engages the stop member 118, the inclined surface 124 will exert a wedging effect upon the disc 108, forcing the same toward the plate 82 until the tang 120 moves out of the slot 122 and engages the surface of the disc 108 as shown in Fig. 8. In this last said relationship of the tang 120 and disc 108, the sleeve 94 and operating shaft 74 are movable clockwise independently of the plug valve member 24. During counterclockwise rotation of the sleeve 94 the normal edge 126 of the tang 120 will engage an edge of the slot 122 and disengagement of the tang 120 from the slot 122 will not occur when the arm 114 engages the other stop 116.

The end of the sleeve 94 is also provided with an upturned flange 130 which is adapted to engage the bottom of a recess 132 formed on the underside of the cover plate 84. The flange 130 and recess 132 are aligned in the "off" position of the plug valve member 24 and are cooperable to prevent direct counterclockwise or clockwise rotation of the sleeve 94. To rotate the sleeve 94 in either of said directions, it is necessary first to depress the same toward the cover 82 against the bias of the spring 110 until the flange 130 is clear of the recess 132. Also, the flange 130 is engageable with the abutment 128 during movement of the sleeve 94 independently of the disc 108 and cooperative therewith to define the range of said independent movement.

In the operation of the device, the inlet 12 may be connected by a suitable means to a supply line and the outlets 18 and 20 connected to supply fuel to a broiling burner and an oven burner respectively.

Should the operator desire to conduct a baking operation, the dial 106 is first pushed inwardly toward the casing 10 causing the sleeve 94 to slide inwardly on the valve stem guided by the tongues 96 and slots 98. This inward movement of the sleeve 94 moves the flange 130 out of the recess 132 causing compression of the spring 110. Rotation of the dial 106 can now occur in a clockwise direction as viewed in Fig. 1. The dial 106 may be released from its inward position upon clockwise rotation thereof sufficiently to move the flange 130 out of line with the recess 132.

The assembly comprising operating shaft 74, sleeve 94, disc 108 and plug valve 24 may be thus rotated clockwise as a unit until the arm 114 engages the stop member 118 as shown in Fig. 4. In this position of the plug valve 24, the port 26 is aligned with the inlet 12 thereby permitting flow of fuel from the inlet 12 to the chamber 30. Further clockwise rotation of the dial 106 forces the tang 120 out of the slot 122 as hereinbefore described and shown in Fig. 8. The sleeve 94 and operating shaft 74 are now rotatable clockwise as a unit independently of the plug valve 24 which remains in the last said position until the flange 130 engages the abutment 128 as shown in Fig. 4.

The calibration of the device is preferably adjusted by means of screws 92, 93 whereby the operating shaft 74 is operative to position the valve member 46 in the customary range of temperature settings during rotation thereof between the disengaged position of tang 120 and the position wherein the flange 130 engages abutment 128.

When the dial 106 is rotated counterclockwise from a temperature setting to the "off" position, the tang 120 will ride on the surface of the disc 108 until the tang 120 overlies the slot 122 whereupon the disc 108 will move upward under the bias of spring 110 into engagement with abutment 128, latching the disc 108 to the sleeve 94 and thereby causing the disc 108 and plug valve member 24 to rotate with the sleeve 94 to the "off" position.

Should the operator desire to conduct a broiling operation, the dial 106 may be pushed inwardly toward the casing 10, until the flange 130 is moved out of the recess 132 as before. In this case, the dial 106 is rotated counterclockwise and the edge 126 of the tang 120 engages the edge of the slot 122 thereby preventing disengagement of the tang 120. Thus, the assembly including the plug valve 24, disc 108, sleeve 94 are rotated as a unit counterclockwise until the arm 114 engages the stop 116 as shown in Fig. 3. In this position of the plug valve member 24, the recess 28 connects the inlet 12 with the outlet 18 thereby supplying fuel to the broiling burner.

It should now be apparent that when the control is used as an oven thermostat, the plug valve member 24 is fully open at all temperature settings, thus insuring a minimum restriction to gas flow. Also rotation of the dial 106 is not restricted by rotation limits of the plug valve 24, thus providing finer temperature settings. In addition, the device is capable of controlling two burners by a single manually operable means.

While only one embodiment of the invention has been herein shown and described, it will be apparent to those skilled in the art that the construction and arrangement of parts may be in other ways variously embodied or changed without departing from the scope of the invention as defined in the appended claims.

I claim:

1. In a control device, the combination comprising a casing having an inlet passage and an outlet passage for fluid, a rotary valve member having ports adapted to register with said inlet passage, valve means associated with said outlet passage including a valve seat and a regulating valve movable relative to said seat for controlling flow through said outlet passage, rotatable adjustment means operatively connected to said regulating valve and rotatable between a plurality of positions for adjusting said regulating valve relative to said seat, a driving connection between said adjustment means and said rotary valve member for transmitting rotational movement therebetween, and means associated with said adjustment means operative to release said driving connection upon movement of said adjustment means to one of said positions whereby said regulating valve may be adjusted independently of said rotary valve member.

2. In a control device, the combination comprising a casing having an inlet and a plurality of outlet passages for fluid, a rotary valve member rotatable in said casing and having passages arranged to bring one of said outlet passages in register with said inlet passage in one position of said valve member and another of said outlet passages in register with said inlet passage in another position of said valve member, valve means associated with said other outlet passage and including a valve seat and a valve member reciprocal between open and closed positions relative to said seat for controlling the flow of fluid through said other outlet pasage, means including a manually operable element operatively associated with said rotary valve member and said reciprocal valve member movable in one direction for rotating said rotary valve to said one position, movable in another direction for rotating said rotary valve to said other position, and movable through a predetermined range of movement for adjusting the position of said reciprocal valve member relative to said seat, and detent means for holding said rotary valve member in said one position during movement of said element through said predetermined range of movement.

3. In a device for controlling the flow of fluid, the combination comprising a casing having inlet and outlet passages for fluid, a rotary valve member rotatable between positions in said casing and having passages arranged to be brought into and out of registry with said casing passages as said valve member is rotated, said valve member having one position wherein all of said casing passages are out of registry with said valve passages, valve means within one of said casing passages including a valve seat and a valve member reciprocal between positions relative to said seat for controlling the flow of fluid through said one passage, a member operatively associated with said rotary valve member and said reciprocal valve member movable through a first predetermined range of movement for positioning said reciprocal valve member relative to said seat and moving said rotary valve member in one direction from said one position to another position and movable through a second predetermined range of movement for positioning said reciprocal valve member relative to said seat, and means operatively associated with said movable member for holding said rotary valve member in one of said positions during movement of said member through said second predetermined range.

4. In a multiple valve, a casing having an inlet and a pair of outlet openings, a rotary valve member rotatable between controlling positions in said casing and having one passage adapted to be moved into registry with said inlet opening and one of said outlet openings upon rotation of said valve member to one of said positions and another passage adapted to be moved into registry with said inlet openings and the other said outlet opening, upon rotation of said valve member to another of said positions, temperature responsive valve means for controlling said one outlet opening and including a valve seat cooperable with a second valve member reciprocal relative to said seat and a member responsive to a temperature condition for actuating said second valve member, adjustment means for said temperature responsive valve means and including a member rotatable in one direction through a predetermined range of temperature settings and to a predetermined position in another direction, means associated with said member for moving said rotary valve member to said one position as said member is rotated into said predetermined range of temperature settings, and means associated with said member for moving said rotary valve member to said other position when said member is rotated to said predetermined position.

5. In a multiple valve, the combination comprising a casing having an inlet and an outlet opening, a shut-off cock rotatable in said casing and having a port adapted to be moved upon rotation of said cock into and out of registry with said inlet opening, temperature responsive valve means for controlling said outlet opening and including a reciprocal valve member cooperable with a valve seat and a member responsive to a temperature condition for actuating said valve member between positions relative to said seat, means including a rotatable member for adjusting said temperature responsive valve means, said member being rotatable from one position to another and in a predetermined range of temperature settings beyond said other position, means connecting said member and said rotary valve member for moving said rotary valve member to effect registry of said port with said inlet opening as said rotatable member is moved from said one position to said other position, and means associated with said member for releasing said connecting means when said rotatable member is moved beyond said other position whereby said member moves through said predetermined range of temperature settings independently of said rotary valve member.

6. In a multiple valve, the combination comprising a casing having an inlet and a pair of outlet openings, a rotary valve member rotatable between positions in said casing and having ports positioned to supply fluid to one of said outlets in one of said positions of said valve member and to the other of said outlets in another of said positions, valve means for controlling said outlet opening and including a reciprocal valve member cooperable with a valve seat, temperature responsive means for actuating said valve member between positions relative to said seat, a rotatable stem extending through said rotary valve member and operatively connected to said reciprocal valve member for adjusting the temperature at which the same engages said seat, a latching connection associated with said stem and said rotary valve member for transmitting rotational movement of said stem to said rotary valve member when said stem is rotated in one direction, and means associated with said latching connection for releasing the same in said one position of said rotary valve member whereby said stem may be rotated independently of said rotary valve member.

7. In a control device for a cooking range having baking and broiling burners, the combination comprising a casing having an inlet for fuel, an outlet for supplying fuel to the broiling burner and an outlet for supplying fuel to the baking burner, a rotary valve member rotatable between positions in said casing and having ports positioned to supply fuel to the broiling burner in one of said positions and to the baking burner in another of said positions, valve means movable between controlling positions in said casing for controlling said outlet to said baking burner, means responsive to a temperature condition and operatively connected to said valve means for moving said valve means between controlling positions, means including a rotatable member operatively connected to said valve means for adjusting the same between said controlling positions, a releasable driving connection between said rotatable member and said rotary valve member for simultaneously rotating the latter and adjusting said valve means, and means cooperable with said driving connection for releasing the same in said other position of said rotary valve member whereby further adjustment of said valve means may be effected independently of said rotary valve member.

8. In a control device for a gas cooking range having baking and broiling burners, the combination comprising a casing having an inlet for fuel, an outlet for supplying fuel to the baking burner and an outlet for supplying fuel to the broiling burner, a rotary valve member rotatable between positions in said casing and having ports arranged to supply fuel to the broiling burner in one of said positions and to the baking burner in another of said positions, valve means for controlling said baking burner outlet, and means responsive to a temperature condition for actuating said valve means, means including a rotatable member associated with said temperature responsive valve means for adjusting the same, a rotatable driving connection between said rotatable member and said rotary valve, stop means positioned to be engaged by said driving connection, and yieldable means associated with said driving connection for disconnecting the same upon additional movement of said rotatable member when said driving connection engages said stop means.

9. A control device comprising a casing having an inlet and a pair of outlets for fluid, a first valve seat intersecting said inlet and outlets, a rotatable valve member engageable with said seat and having a port for registry with said inlet in one position and adapted to connect one of said outlets with said inlet in said position, said valve member having a passage adapted to connect said inlet with the other said outlet in another position, a second valve seat in said casing intermediate said first valve seat and said one outlet, a reciprocable valve member engageable with said second seat for controlling flow from said port to said one outlet, thermally responsive means operably connected to said reciprocable valve member for regulating flow to said one outlet, adjusting means operable for positioning said reciprocable valve member relative to said second valve seat, means for releasably connecting said adjusting means and said rotatable valve member for movement thereof to said one position, and means operable in said one position for releasing said connection and causing said reciprocable valve member to be positioned independently of said rotatable valve member, said last means being ineffective upon movement of said rotatable valve member to said other position.

10. A control device as claimed in claim 9 wherein said releasable connection includes a detent having an inclined surface and an oppositely disposed normal surface engageable with oppositely disposed abutments respectively, yieldable means for biasing said detent and abutments to a latching position, said last means being effective upon movement of said rotatable valve member in one direction for overcoming said biasing means and causing said inclined surface to disengage said abutments but being ineffective upon movement of said rotatable valve member in another direction for causing said normal surface to disengage said abutments.

References Cited in the file of this patent
UNITED STATES PATENTS

| | | |
|---|---|---|
| 2,153,886 | Grayson | Apr. 11, 1939 |
| 2,237,720 | Waddell | Apr. 8, 1941 |
| 2,245,060 | Waddell | June 10, 1941 |
| 2,303,011 | Weber | Nov. 24, 1942 |
| 2,694,525 | Winet et al. | Nov. 16, 1954 |